US008544009B2

(12) United States Patent  
Shimizu et al.

(10) Patent No.: US 8,544,009 B2  
(45) Date of Patent: Sep. 24, 2013

(54) METHOD, APPARATUS, AND PRODUCT FOR SCHEDULING OF DISTRIBUTED PROCESSING BASED ON AVERAGE EXECUTION TIME AND COMMUNICATION TIME

(75) Inventors: Toshihiro Shimizu, Kawasaki (JP); Soichi Shigeta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1218 days.

(21) Appl. No.: 12/345,342

(22) Filed: Dec. 29, 2008

(65) Prior Publication Data

US 2009/0187907 A1 Jul. 23, 2009

(30) Foreign Application Priority Data

Jan. 17, 2008 (JP) ................................. 2008-008356

(51) Int. Cl.  
*G06F 9/46* (2006.01)  
*G06F 15/16* (2006.01)

(52) U.S. Cl.  
USPC ............ 718/102; 718/105; 709/201; 709/202

(58) Field of Classification Search  
USPC ........................................................ 718/102  
See application file for complete search history.

(56) References Cited

U.S. PATENT DOCUMENTS

| 6,557,055 | B1* | 4/2003 | Wiese .............................. 710/36 |
| 6,963,954 | B1* | 11/2005 | Trehus et al. .................. 711/137 |
| 7,000,229 | B2* | 2/2006 | Gere .............................. 717/169 |
| 7,711,797 | B1* | 5/2010 | Huang .......................... 709/218 |
| 2003/0105619 | A1* | 6/2003 | Elias ................................. 703/19 |
| 2005/0114826 | A1* | 5/2005 | Barthram ....................... 717/100 |
| 2005/0271019 | A1* | 12/2005 | Yuan et al. .................... 370/338 |
| 2008/0066073 | A1* | 3/2008 | Sen ............................... 718/105 |

FOREIGN PATENT DOCUMENTS

| JP | 02-068651 | 3/1990 |
| JP | A 9-73432 | 3/1997 |
| JP | A 2004-110318 | 4/2004 |

OTHER PUBLICATIONS

Claffy et al., "Measurement Considerations for Assessing Unidirectional Latencies", Internetworking: Research and Epertence, 1993.*  
Blazewicz et al., "Distributed processing of divisible jobs with communication startup costs," Jun. 1997, Second International Colloquium on Graphs and Optimization, vol. 76, Issues 1-3, pp. 21-41.*  
Notification of reasons for refusal issued by the Japanese Patent Office in corresponding Japanese App. No. 2008-008356, mailed Dec. 6, 2011.

* cited by examiner

*Primary Examiner* — Lewis A Bullock, Jr.  
*Assistant Examiner* — Kevin X Lu  
(74) *Attorney, Agent, or Firm* — Greer, Burns & Crain, Ltd

(57) ABSTRACT

A master calculator assigns a series of processing groups to a communicable worker calculator. The master receives information about an execution time and a waiting time from the worker calculator for the series of processing groups. The computer acquires the time elapsed between transmitting the processing group transmitted to the worker calculator and receiving the execution result of the processing group from the worker calculator. The master calculates the communication time required for communication with the worker calculator on the basis of the information received and the elapsed time acquired. The master calculates the number of processings to be assigned to the worker calculator on the basis of the communication time calculated. The master generates a processing group to be assigned to the worker calculator on the basis of the number of processings calculated, and transmits the processing group generated to the worker calculator.

10 Claims, 14 Drawing Sheets

FIG. 5

| WORKER NAME | IP ADDRESS | STATE |
|---|---|---|
| W1 | xxx.yyy.z.t | IN USE |
| W2 | xxx.yyy.c.d | UNDER SUSPENSION |
| ... | ... | ... |
| Wi | xxx.yyy.g.j | EMPTY |
| ... | ... | ... |
| Wm | xxx.yyy.k.l | IN USE |

| THE NUMBER OF PROCESSINGS | PARAMETER | | |
|---|---|---|---|
| | $t$ | $w$ | $\delta$ |
| $n_1$ | $t_1$ | $w_1$ | $\delta_1$ |
| $n_2$ | $t_2$ | $w_2$ | $\delta_2$ |
| ... | ... | ... | ... |
| $n_j$ | $t_j$ | $w_j$ | $\delta_j$ |
| ... | ... | ... | ... |
| $n_p$ | $t_p$ | $w_p$ | $\delta_p$ |

800

800-1 ... 800-j ... 800-p

METHOD, APPARATUS, AND PRODUCT FOR SCHEDULING OF DISTRIBUTED PROCESSING BASED ON AVERAGE EXECUTION TIME AND COMMUNICATION TIME

CROSS-REFERENCE TO RELATED APPLICATIONS

This application is related to and claims priority to Japanese patent application No. 2008-8356 filed on Jan. 17, 2008 in the Japan Patent Office, and incorporated by reference herein.

BACKGROUND

1. Technical Field

The present invention relates to a distributed processing technique for a master calculator (hereinafter referred to simply as "a master") to cause multiple worker calculators (hereinafter referred to simply as "workers") to perform distributed processing through a series of processing groups.

2. Description of the Related Art

Conventionally, in the flow of processing passed between a master and a worker, which can communicate with each other via a network, the master throws processing (including data required for execution thereof) into the worker. Next, the worker into which the processing has been thrown executes the processing. Then, the worker returns the execution result of the processing to the master. By performing this with multiple workers, the master causes the workers to perform distributed processing of the whole processing.

Japanese Laid-open Patent Publication No. H9-73432, there discloses a technique in which processing of one or more transactions to be processed by the same processing process is requested collectively, in an online distributed system. Specifically, a processing process for processing transaction data is disclosed. Then, in online control processing for passing the transaction data to the processing process, one or more transactions to be processed by the same processing process, among transactions waiting to be processed, are collected and passed to the processing process by one processing request.

Japanese Laid-open Patent Publication No. 2004-110318 discloses a technique in which processing is assigned in units of task groups, each of which is constituted by multiple tasks. Specifically, an upper management apparatus assigns processing of a task group to a lower management apparatus. Then, the lower management apparatus assigns tasks included in the task group to task execution apparatuses. The task execution apparatuses execute the tasks and transmit execution results to the lower management apparatus. Then, the lower management apparatus collects the task execution results and transmits the collected results to the upper management apparatus. At the end, the upper management apparatus puts the collected results together and outputs them.

However, in the above prior-art technique disclosed in Japanese Laid-open Patent Publication No. H9-73432, there is no mention of how many transactions are collected and passed to the processing process, though it has a great influence on the efficiency of the distributed processing.

For example, if the number of transactions to be collected is increased, the number of transmissions of a processing request can be reduced. However, the response time required until obtaining the result of the execution is increased. Furthermore, if too many transactions are collected, there may be a case, when the number of usable workers increases, it is not possible to equally assign transactions to the workers.

Furthermore, when there are a small number of usable workers, there is a possibility that, when the number of transactions in a queue decreases, all the transactions are to be processed by one worker. Thus, if transactions are inappropriately collected, a problem is caused that usable workers cannot be sufficiently utilized and, consequently, the time required for the distributed processing is lengthened.

In the above prior-art technique disclosed in Japanese Laid-open Patent Publication No. 2004-110318 also, there is no mention of the number of tasks constituting a task group (the number of tasks to be collected), and there is a problem that usable workers cannot be sufficiently utilized and, consequently, the time required for the distributed processing is lengthened.

The object of the present invention is to provide a distributed processing technique capable of reducing communication traffic between the master and the worker and improving the efficiency of distributed processing by assigning a processing group in which processings, the execution time for each of which is short, are appropriately collected, in order to solve the problems of the conventional techniques disclosed above.

SUMMARY

A computer is a master calculator which assigns a series of processing groups to a communicable worker calculator. The computer receives information about an execution time and a waiting time from the worker calculator among the series of processing groups. The execution time is a time for a processing group transmitted beforehand, and the waiting time is a time from receiving the processing group transmitted beforehand to starting execution thereof. The computer acquires the time elapsed from transmitting the processing group transmitted to the worker calculator to receiving the execution result of the processing group from the worker calculator. The computer calculates the communication time required for communication with the worker calculator on the basis of the information received and the elapsed time. The computer calculates the number of processings to be assigned to the worker calculator on the basis of the communication time calculated. The computer generates a processing group to be assigned to the worker calculator on the basis of the number of processings calculated. The computer transmits the processing group generated to the worker calculator.

BRIEF DESCRIPTION OF THE DRAWINGS

FIG. 5 is a diagram illustrating the contents stored in a worker management table;

FIG. 8 is a diagram illustrating an example of the contents stored in a parameter table;

DESCRIPTION OF THE PREFERRED EMBODIMENTS

A preferred embodiment of this distributed processing technique will be disclosed below with reference to accompanying drawings. In this specification, a distributed processing apparatus means a master or a worker, and a distributed processing program means a program installed in the distributed processing apparatus.

(System Configuration of System)

Figure 1:
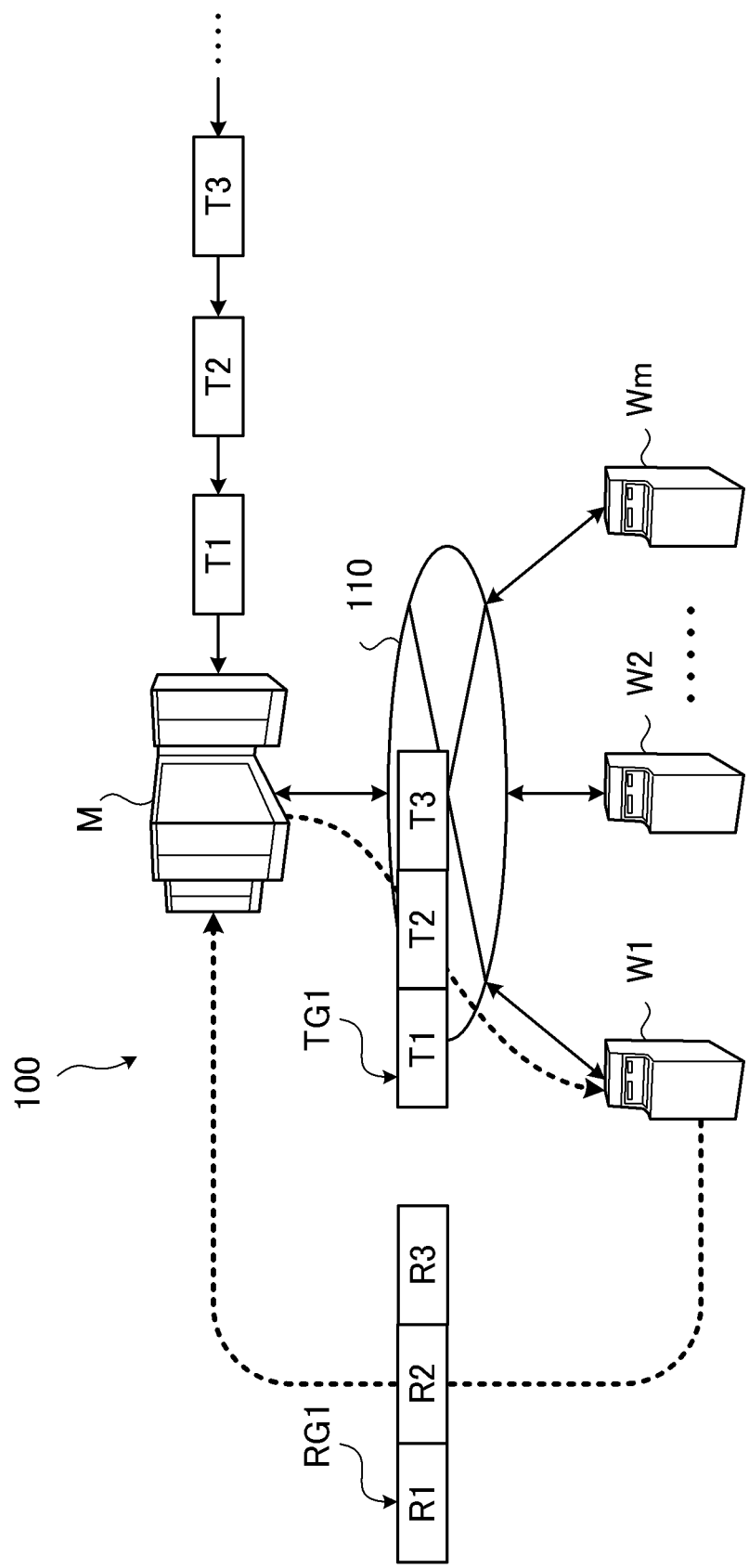
FIG. 1 is a system configuration diagram of a system.

The system configuration of a system 100 according to this embodiment will be disclosed. FIG. 1 is a system configuration diagram of the system. In FIG. 1, the system 100 is constituted by a master M and a group of workers W1 to Wm which can communicate via a network 110 such as the Internet, a LAN and a WAN.

For example, a search system in which multiple database servers are virtually regarded as an integrated database server and a Web service system constituted by a portal server and multiple application servers can be applied to the system 100.

The workers W1 to Wm may have different processing abilities or they may be different in the structures of the OS, the hardware architecture and the like. Furthermore, the communication quality of the network 110 is not necessarily required to be constant or uniform.

In this system 100, the master M collects the processing whose the execution time is short, generates processing groups
which the master M collects.

The master M collects processing whose execution time is short, generates processing groups, and throws the generated series of processing groups into appropriate workers W1 to Wm. Then, the workers W1 to Wm execute the processing groups thrown into them and return the execution results to the master M. In this case, the processing execution results are returned not in units of processings but in units of processing groups.

Here, it is assumed that the execution times required for processings constituting a processing group are uniform. That is, the granularities of the processings (the amounts of the processings) are uniform or vary only to an ignorable extent. The execution time required for each processing is assumed to be shorter than the time for communication (transfer time) between the master and the worker.

Concrete processing examples include, for example, tens of thousands to tens of millions of processings performed when a scenario is stochastically simulated with the use of a Monte Carlo method in option/risk calculation in an financial institution or the like, and a query indicating a command to perform search, update, deletion and the like of data, which is issued to an integrated database.

In the case of executing a large number of processings, the execution time for each of which is short, as above, if the processings are thrown into the workers W1 to Wm from the master M in units of processings, communication overhead, such as time for communication between the master and the worker and idle time in the workers W1 to Wm, is actualized. Therefore, by setting a processing group, in which multiple processings are collected, as one processing unit, it is ensured that there is enough execution time to make it possible to hide the communication overhead by latency hiding.

Now, an example of throwing of processings in the system 100 will be disclosed with the worker W1 as an example. The master M generates a processing group TG1 in which inputted processings T1, T2 and T3 are collected as one. Next, the master M throws the processing group TG1 into the worker W1 determined as the assignment destination (transmits it via the network 110).

After that, the worker W1 executes the processing group TG1 thrown by the master M. After execution of all the processings T1, T2 and T3 constituting the processing group TG1 is completed, the worker W1 returns a processing result RG1, in which processing results R1, R2 and R3 of the processings T1, T2 and T3 are collected, to the master M.

In this way, by causing the processing group TG1 in which the multiple processings T1, T2 and T3 are collected to be distributedly processed as one processing unit, the number of communications between the master and the worker is reduced, and communication overhead, such as communication time and idle time, is hidden. By collectively returning execution results from the worker W1 to the master M after execution of all the processings T1, T2 and T3 is completed, traffic on the network 110 is reduced.

Furthermore, in order to start execution of the next processing group immediately after completing execution of a processing group thrown by the master M, each of the workers W1 to Wm receives another processing group in parallel with execution processing of the processing group. The number of processing groups waiting to be executed, except for the processing group being executed, in the workers W1 to Wm is assumed to be "1". In this case, each of the workers W1 to Wm repeats state transition among the three states to be disclosed below.

Figure 2:
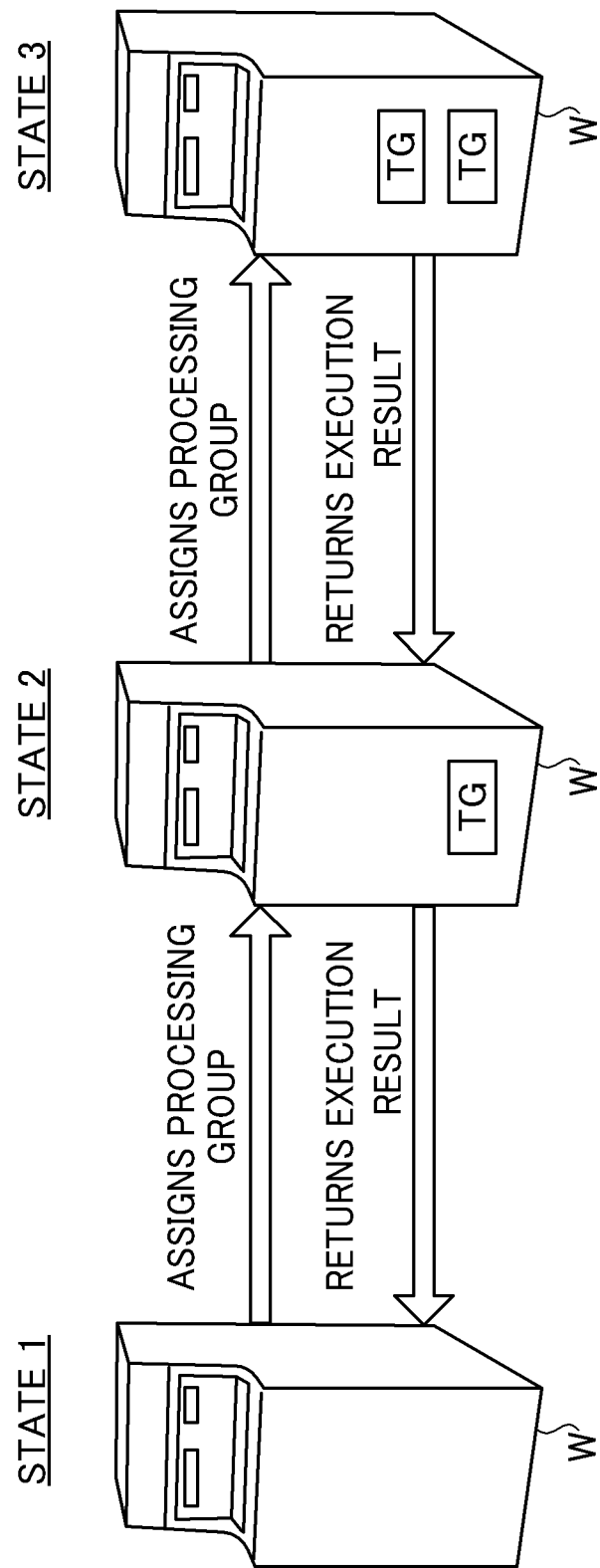
FIG. 2 is a diagram illustrating state transition of a worker W.

FIG. 2 is a diagram illustrating state transition of a worker W. Hereinafter, the "workers W1 to Wm" will be referred to simply as the "worker W" unless otherwise specified. In FIG. 2, a state 1 is a state in which a processing group has not been assigned yet by the master M. A state 2 is a state in which one processing group has been assigned by the master M. A state 3 is a state in which two processing groups have been assigned by the master M.

To explain the flow of the state transition, when one processing group is assigned to one of the worker W from the master M, the state 1 transitions to the state 2. Furthermore, when a new processing group is assigned from the master M while the processing group assigned from the master M is being executed in the state 2, the state 2 transitions to the state 3.

On the other hand, when execution of one of the two processing groups assigned from the master M is completed in the state 3, and the execution result is returned to the master M, the state 3 transitions to the state 2. When execution of the processing group assigned from the master M is completed in the state 2, and the execution result is returned to the master M, the state 2 transitions to the state 1.

Figure 3:
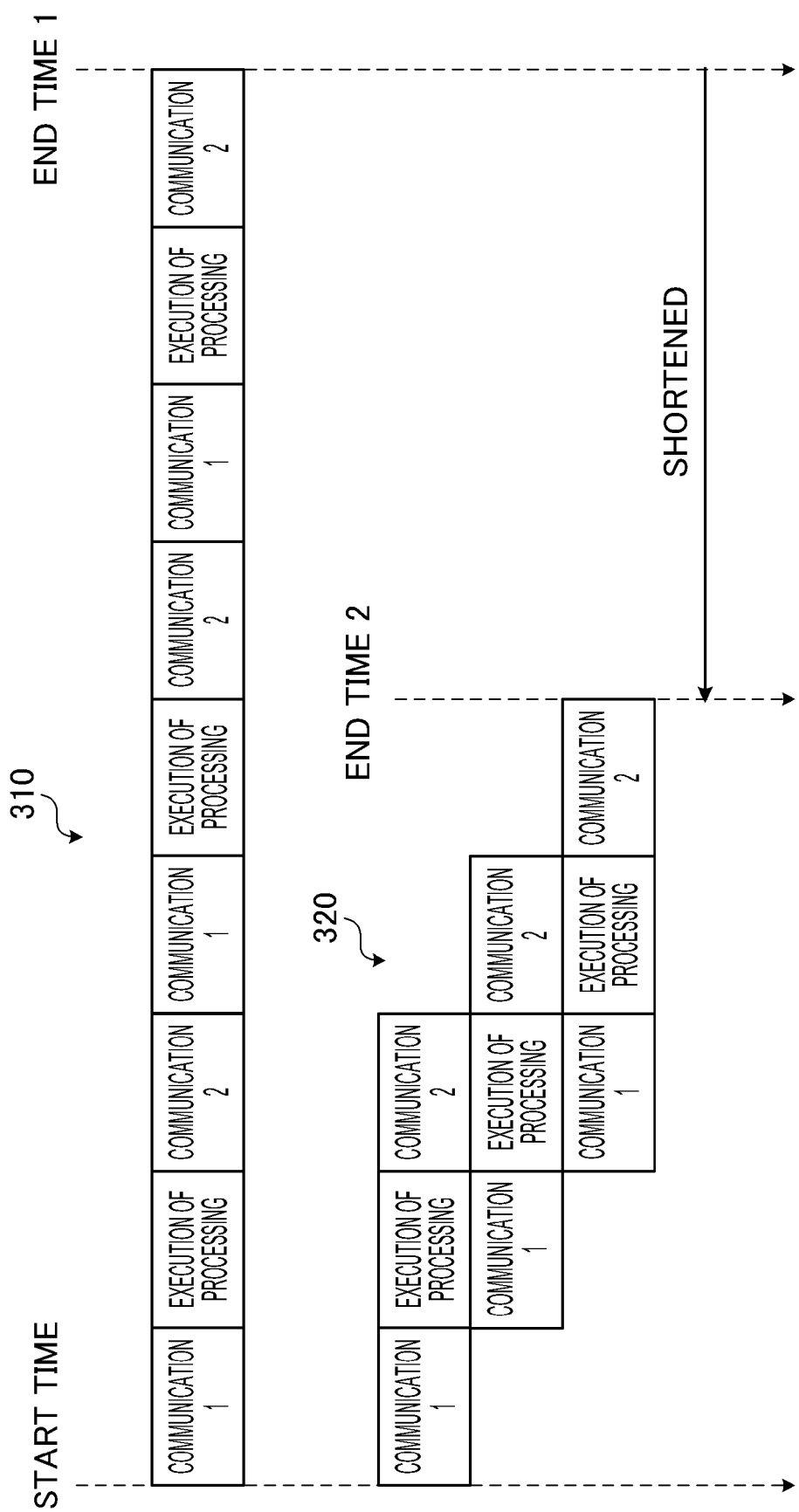
FIG. 3 is a Gantt chart concretely showing the time required for distributed processing.

Here, the time required for the distributed processing of a series of processing groups will be concretely disclosed. FIG. 3 is a Gantt chart concretely showing the time required for the distributed processing. In FIG. 3, "communication 1" indicates communication time required for passing of a processing group between the master and the worker. "Processing execution" indicates execution time required for execution of the processing group in the worker W. "Communication 2" indicates communication time required for passing of an execution result between the master and the worker.

In FIG. 3, a graph 310 shows the time required when distributed processing of the next processing group is started after distributed processing of one processing group is completed.

In this case, the whole required time (from start time to end time 1) is indicated by the "communication 1" "processing execution" and "communication 2" for each processing group arranged in series.

On the other hand, a graph 320 shows the time required when receiving of the next processing group is started while one processing group is being executed. In this case, the whole required time (from the start time to end time 2) is shortened by arranging the "processing execution", "communication 1" and "communication 2" in parallel, in comparison with the required time (the start time to the end time 1) shown in the graph 310.

Thus, by executing communication processing between the master and the worker in parallel with execution processing of a processing group by the worker W, the time for communication between the master and the worker (the communication 1 and the communication 2) is hidden by the processing group execution time, so that the time required for distributed processing of a series of processing groups is shortened.

(Hardware Configuration of Distributed Processing Apparatus)

Figure 4:
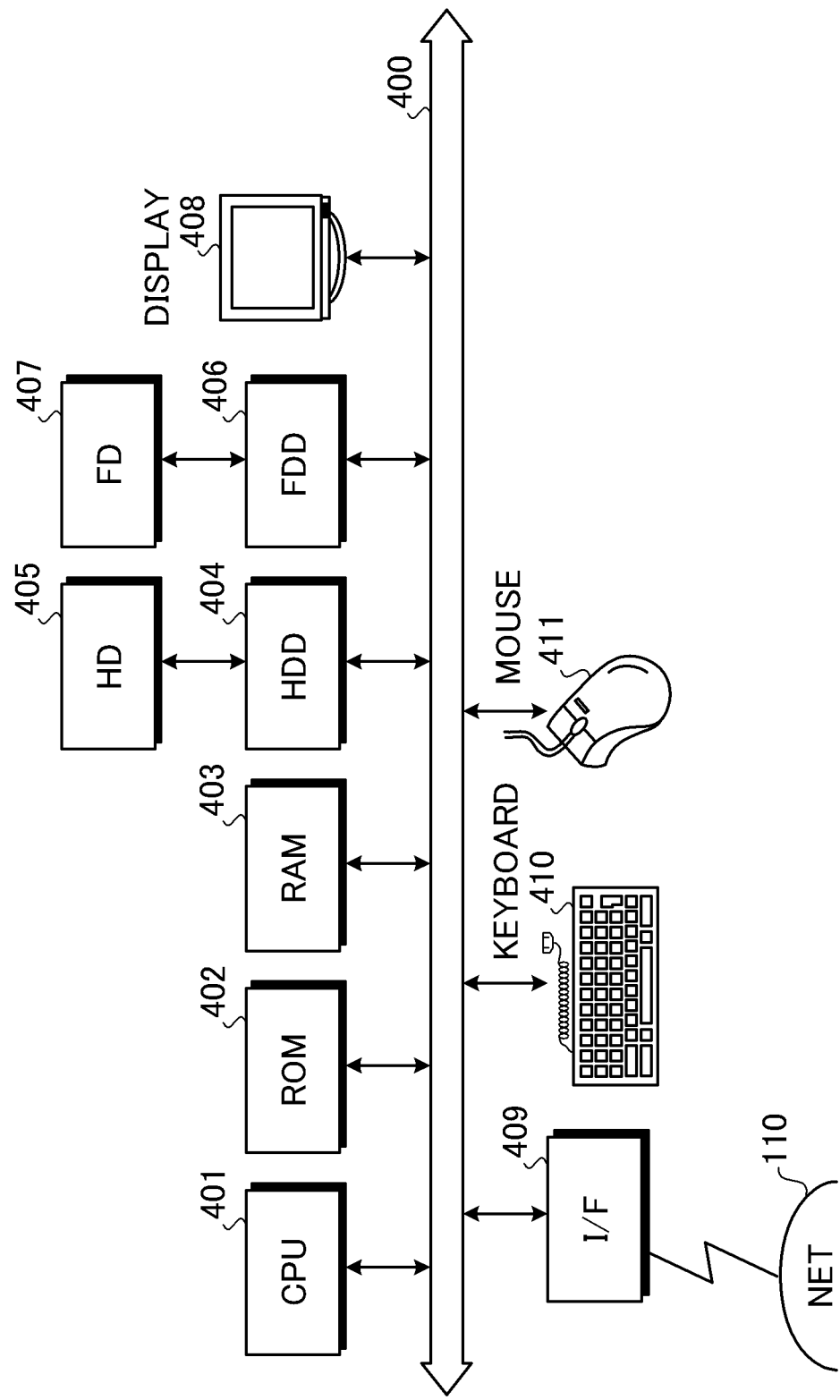
FIG. 4 is a block diagram showing the hardware configuration of a distributed processing apparatus.

Next, the hardware configuration of the distributed processing apparatus according to this embodiment will be disclosed. FIG. 4 is a block diagram showing the hardware configuration of the distributed processing apparatus.

In FIG. 4, the distributed processing apparatus is provided with a CPU 401, a ROM 402, a RAM 403, an HDD (hard disk drive) 404, an HD (hard disk) 405, an FDD (flexible disk drive) 406, an FD (flexible disk) 407 as an example of a removable recording medium, a display 408, an I/F (interface) 409, a keyboard 410, and a mouse 411. The components are connected to one another via a bus 400.

Here, the CPU 401 controls the entire distributed processing apparatus. In the ROM 402, programs such as a boot program are recorded. The RAM 403 is used as workware of the CPU 401. The HDD 404 controls reading/writing of data from/to the HD 405 in accordance with the control by the CPU 401. In the HD 405, data written under the control of the HDD 404 is stored.

The FDD 406 controls writing and reading of data to and from the FD 407 in accordance with control by the CPU 401. The FD 407 stores data written under the control of the FDD 406, and causes the data stored in the FD 407 to be read by the distributed processing apparatus.

In addition to the FD 407, a CD-ROM (CD-R or CD-RW), an MO, a DVD (Digital Versatile Disk) and a memory card are also possible as the removable recording medium. The display 408 displays data, such as a document, an image and function information, including a cursor, an icon and a tool box. For example, a CRT display, a TFT liquid crystal display, a plasma display or the like can be used as this display 408.

The I/F 409 is connected to the network 110 such as the Internet via a communication line and connected to other apparatuses via this network 110. The I/F 409 also serves as an interface between the network 110 and the inside of the distributed processing apparatus, and controls input/output of data from/to external apparatuses. For example, a modem, a LAN adapter or the like can be used as the I/F 409.

The keyboard 410 is provided with keys for inputting characters, figures, various instructions and the like, and it inputs data. A touch-panel type input pad or a numeric keypad is also possible. The mouse 411 moves the cursor, selects a range, moves a window or changes the size of the window. A trackball, a joystick or the like is also possible if it is provided with functions similar to those of a pointing device.

(The Contents Stored in Worker Management Table)

Now, description will be made of a worker management table used to identify the IP address and the usage state of a worker W to be an assignment destination. FIG. 5 is a diagram illustrating the contents stored in the worker management table. A worker management table 500 is provided for the master M. In FIG. 5, an IP address and state information are stored for each worker W under the control of the master M, in the worker management table 500.

The state information indicates the use state of each worker W. Specifically, the state is "empty" before processing is thrown from the master M. Then, when processing is thrown from the master M, the state is rewritten from "empty" to "in use". When an execution result is returned from the worker W, the state is rewritten from "in use" to "empty". When the functions of the worker W are stopped, the state is "under suspension". When the functions are restored, the state is rewritten from "under suspension" to "empty".

The item "in use" may be detailedly shown. For example, the state 2 or the state 3 shown in FIG. 2 may be stored as additional information of "in use". The functions of the worker management table 500 are realized by the storage section such as the RAM 403 and the HD 405 shown in FIG. 4.

(The Contents Stored in Throughput Table)

Figure 6:
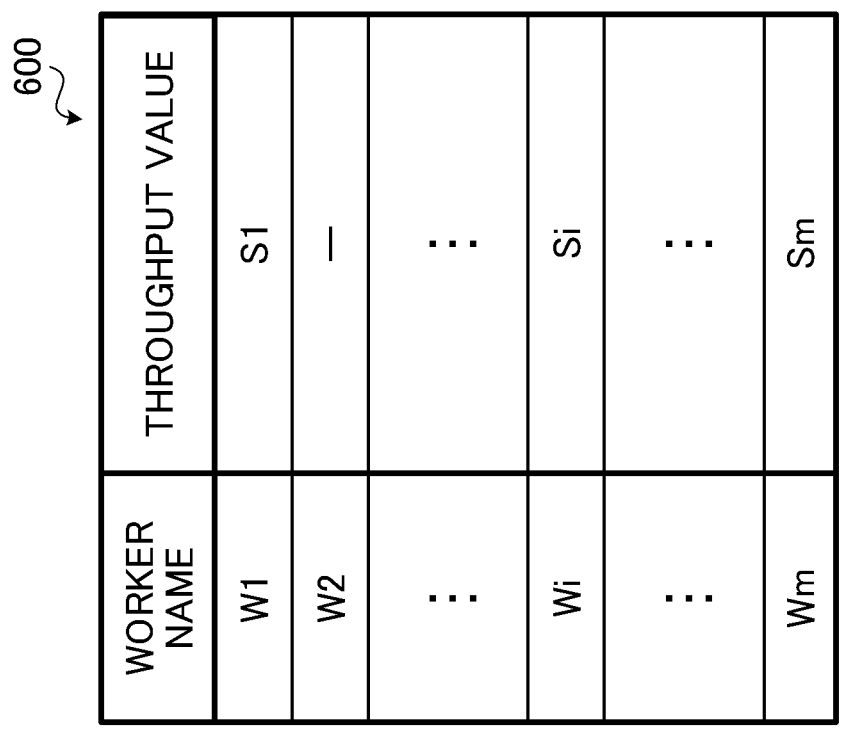
FIG. 6 is a diagram illustrating the contents stored in a throughput table.

Next, description will be made on a throughput table to be used to identify the processing performance of the worker W. FIG. 6 is a diagram illustrating the contents stored in the throughput table. A throughput table 600 is provided for the master M. In FIG. 6, a throughput value for each worker W is stored in the throughput table 600.

The throughput value is an indicator which indicates the processing performance of each worker W, and it can be expressed, for example, by the number of processings which can be executed per unit time. This throughput value dynamically changes according to the use status or the like (for example, the status in which processing thrown by a computer apparatus different from the master M is being executed), for example, with the processing ability (for example, the clock frequency) of the CPU 401 of each worker W as a base.

The throughput value of a worker W to which processing has not been assigned yet (for example, the worker W2) is not registered (indicated by "-" in FIG. 6). The functions of the throughput table 600 are realized by the storage section such as the RAM 403 and the HD 405 shown in FIG. 4.

(Functional Configuration of Distributed Processing Apparatus)

Figure 7:
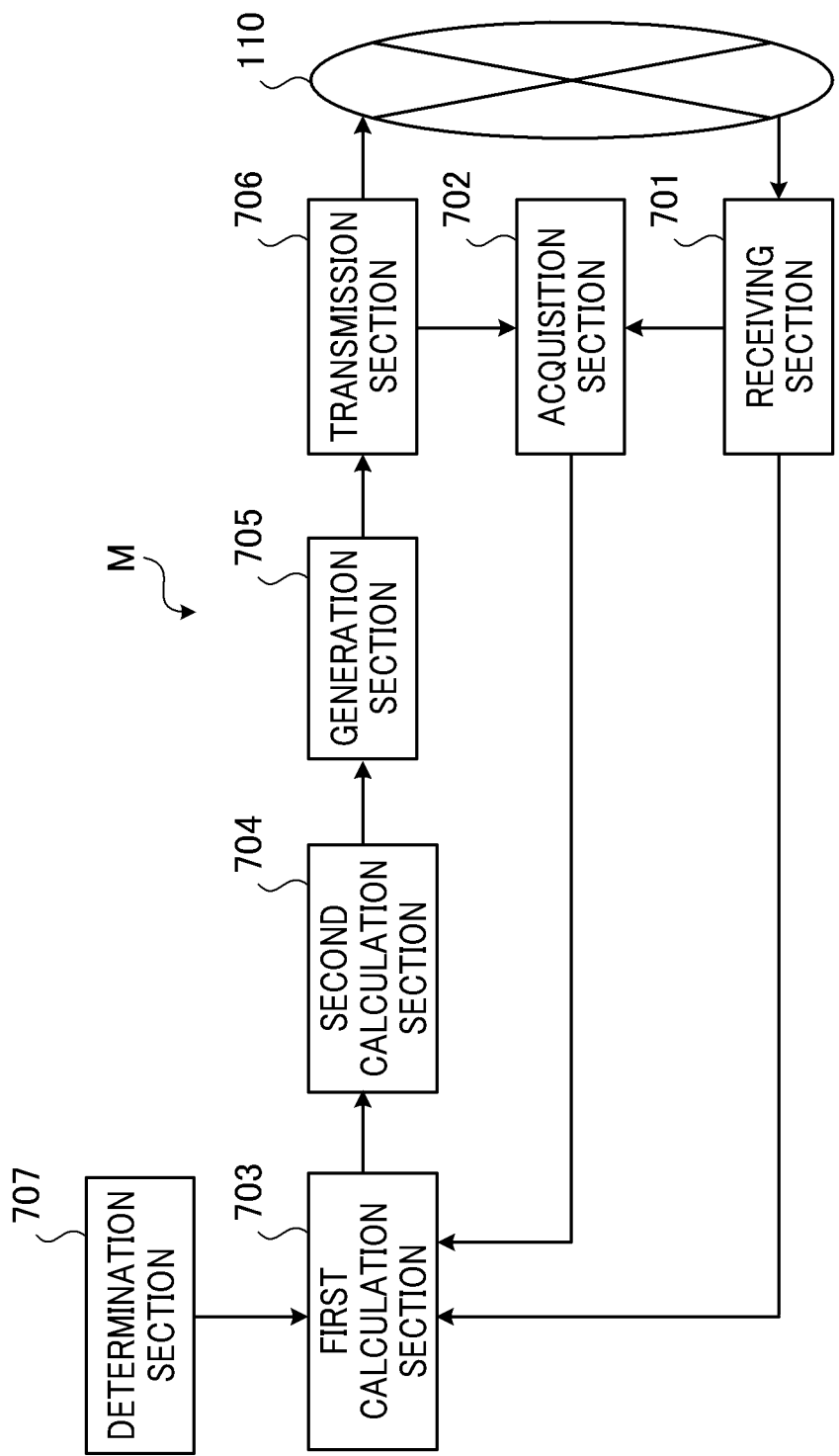
FIG. 7 is a block diagram showing the functional configuration of a master M.

Next, the functional configuration of the distributed processing apparatus will be disclosed. The functional configuration of the master M will be disclosed. FIG. 7 is a block diagram showing the functional configuration of the master M. In FIG. 7, the master M is constituted by a receiving section 701, an acquisition section 702, a first calculation section 703, a second calculation section 704, a generation section 705, a transmission section 706 and a determination section 707.

These functions 701 to 707 can be realized by causing the CPU to execute programs related to the functions 701 to 707 stored in the storage section of the master M, respectively, or by an input/output I/F. Output data from each of the functions 701 to 707 is held in the storage section. It is assumed that a connection-destination function indicated by an arrow in FIG. 7 reads output data of a connection-source function, from the storage section, and causes the CPU to execute the program related to the function.

The receiving section 701 has a function which receives information about the execution time required for a processing group transmitted beforehand among a series of processing groups and the waiting time required from receiving the processing group transmitted beforehand to starting execution thereof, from the worker W. The execution time is the time required for the worker W completing execution of all processings constituting a processing group after starting execution of the processing group.

The waiting time is the waiting time required from when a processing group reaches the worker W to when execution of the processing group is actually started. That is, as a result of a processing group being assigned to an assignment-destination worker W from the master M, the receiving section 701 receives information about the execution time and waiting time of the assigned processing group, from the assignment destination. The information about the execution time and the waiting time is stored in a parameter table 800 to be disclosed later each time the information is received.

The acquisition section 702 has a function which acquires the time elapsed from transmitting the processing group transmitted beforehand to the worker W to receiving the result of execution of the processing group transmitted beforehand from the worker W. Specifically, the elapsed time may be acquired, for example, by measuring the time required from transmitting the processing group to the worker W to receiving the execution result of the processing group from the worker W.

To describe it more specifically, the elapsed time can be measured, for example, from the transmission date and time when a processing group was transmitted to an assignment destination, and the receiving date and time when the execution result of the processing group was received from the assignment destination. It is also possible to acquire the elapsed time which has been measured by an external computer apparatus. The elapsed time is stored in the parameter table 800 to be disclosed later, for example, each time it is acquired.

The first calculation section 703 has a function which calculates the communication time required for communication with the worker W, on the basis of the information received by the receiving section 701 and the elapsed time which has been acquired by the acquisition section 702. Specifically, this is the communication time required for, for example, passing of a processing group between the master and the worker and passing of the execution result of the processing group between the master and the worker.

The first calculation section 703 also has a function which calculates the processing performance of the worker W using the information about the execution time required for the processing group transmitted beforehand. The processing performance of the worker W is, for example, a throughput value for each worker W shown in FIG. 6. The communication time and the processing performance can be calculated with the use of the contents stored in the parameter table (for example, the parameter table 800), which are held for each worker W, though the details will be disclosed later.

The second calculation section 704 has a function which calculates the number of processings to be assigned to the worker W on the basis of the result of calculation by the first calculation section 703. Specifically, the number of processings is calculated, for example, on the basis of the communication time required for communication with the worker W and the processing performance of the worker W. The second calculation section 704 may calculate the number of processings on the basis of any one of the communication time required for communication with the worker W and the processing performance of the worker W.

The second calculation section 704 calculates, for example, such a number of processings that the communication time required for communication with the worker W is equal to or shorter than the execution time required for a processing group in the worker W. More specifically, the second calculation section 704 calculates, for example, such a number of processings n that the execution time required for a processing group, in which n processings are collected, in the worker W is almost similar to the time for communication between the master and the worker (for example, one to two times as much as the communication time).

The generation section 705 has a function which generates a processing group to be assigned to the worker W on the basis of the result of calculation by the second calculation section 704. Specifically, for example, by collecting n processings among multiple processings in a queue in the master M, one processing group is generated. In this case, if there are not n processings in the queue, a processing group is generated in which all the processings existing in the queue are collected.

A unique processing ID (for example, T1, T2 and T3 shown in FIG. 1) is assigned to each processing. Furthermore, a common processing group ID (for example, TG1) is assigned to each of processings constituting one processing group. By assigning a processing ID and a processing group ID in this way, a processing group constituted by multiple processings can be recognized.

The queue is a data structure constructed in the storage section in the master M, and it has a function which queues processings inputted into the master M. Processing to be targeted by distributed processing may be directly inputted into the master M or may be acquired from an external computer apparatus via the network 110.

The transmission section 706 has a function which transmits a processing group generated by the generation section 705 to the worker W. Specifically, a processing group can be transmitted to the worker W, for example, by referring to the worker management table 500 and setting the IP address of an assignment-destination worker W as the destination. When the processing group is transmitted by the transmission section 706, the state of the assignment-destination worker W, among the contents stored in the worker management table 500, is rewritten to "in use".

Thus, by assigning a processing group in which multiple processings are given to the worker W, it is possible to reduce the number of communications performed between the master and the worker in comparison with the case of performing assignment to the worker W in units of processings. As a result, it is possible not only to reduce overhead such as communication time required for communication with the worker W and idle time of the worker W, but also to improve the efficiency of the distributed processing.

Now, concrete examples of the calculation processings performed by the first calculation section 703 and the second calculation section 704 will be disclosed. The parameter table used for the calculation processings performed by the first calculation section 703 and the second calculation section 704 will be disclosed. The parameter table is provided in the master M, for each worker W in association with the worker name.

Here, description will be made on the parameter table for the worker Wi as an example. FIG. 8 is a diagram illustrating an example of the contents stored in the parameter table. In FIG. 8, pieces of parameter information 800-1 to 800-*p* are stored for the numbers of processings n1 to np, respectively, in the parameter table 800.

Each of the pieces of parameter information 800-1 to 800-*p* has parameters t, w and δ. The parameter t indicates the time elapsed from when a processing group is transmitted to the worker Wi to when the execution result of the processing group is received from the worker Wi. The parameter w indicates the waiting time from when the worker Wi receives the processing group and to when it starts execution of the processing group. The parameter δ indicates the execution time required for the processing group in the worker Wi.

The stored contents of the parameters w and δ, among the parameters t, w and δ, are updated each time information about the execution time and the waiting time is received by the receiving section 701. Specifically, for example, when information about the execution time and the waiting time of the processing group of a processings number n1 is received from the worker Wi, the parameter w1 in the parameter information 800-1 is rewritten to the received waiting time and the parameter δ1 is rewritten to the received execution time.

The stored contents of the parameter t are updated each time the elapsed time is acquired by the acquisition section 702. Specifically, for example, when the elapsed time of the processing group, the number of processings of which is n1, is acquired, the parameter t1 in the parameter information 800-1 is rewritten to the elapsed time which has been acquired.

When the information received by the receiving section 701 is about the number of processings which have not been registered with the parameter table 800, it is registered with the parameter table 800 as new parameter information. The functions of the parameter table 800 are realized by the storage section such as the RAM 403 and the HD 405 shown in FIG. 4.

The first calculation section 703 calculates the communication time required for communication with the worker Wi using the contents stored in the parameter table 800. The time for communication between the master and the worker is, for example, the time required for passing of a processing group from the master M to the worker W, and passing of an execution result from the worker W to the master M.

Here, time for communication between the master and the worker can be expressed, for example, by a linear expression shown as the following formula (1). Communication time is denoted by K; the number of jobs constituting a job group is denoted by n; and parameters related to the time for communication between the master and the worker are denoted by k and c.

$$K = k \times n + c \quad (1)$$

These parameters k and c can be calculated, for example, using the parameters t, w and δ stored in the parameter table 800. Specifically, the parameters k and c can be determined, for example, with the following formula (2).

$$t = w + \delta + (k \times n + c) \quad (2)$$

To describe this more detailedly, the parameters k and c can be determined by setting up simultaneous equations using parameters k and c (the following formulas (3) and (4)) for x and y (x and y: natural numbers) which satisfy nx≠ny using the above formula (2).

$$tx = wx + \delta x + (k \times nx + c) \quad (3)$$

$$ty = wy + \delta y + (k \times ny + c) \quad (4)$$

Next, two pieces among the pieces of parameter information 800-1 to 800-*p* satisfying nx≠ny are read from the parameter table 800. Then, parameters nx, ny, tx, ty, wx, wy, δx and δy included in the read two pieces of parameter information are substituted into the above formulas (3) and (4) to determine the parameters k and c.

When two pieces among the pieces of parameter information 800-1 to 800-*p* satisfying nx≠n are read, for example, the latest two pieces of parameter information stored may be read. Thereby, the parameters k and c on which the latest use status of the worker W is reflected can be determined.

If the parameters k and c determined with the use of the above formulas (3) and (4) are "equal to or less than 0", it is possible to use preset initial values as the parameters k and c. The initial values of the parameters k and c may be arbitrarily set, or average values of the parameters k and c determined in the past may be set.

When the pieces of parameter information 800-1 to 800-*p* required for determining the parameters k and c are not stored in the parameter table 800 (for example, at the time of the first distributed processing), the preset initial values may be used.

Specifically, the parameters k and c are determined by substituting initial values corresponding to the above parameters nx, ny, tx, ty, wx, wy, δx, and δy into the above formulas (3) and (4). The initial values about the parameters n, t, w, δ, k and c are stored in advance in the storage section such as the RAM 403 and the HD 405 shown in FIG. 4.

The first calculation section 703 calculates the processing performance of the worker W using the contents stored in the parameter table 800. Specifically, for example, a parameter τ indicating the execution time in units of processing is calculated with the use of the parameters δ and n stored in the parameter table 800. More specifically, the parameters τ can be determined, for example, with the following formula (5).

$$\tau = \frac{\sum_{j=1}^{p} \delta j}{\sum_{j=1}^{p} nj} \quad (5)$$

This means that an average value of the execution time in units of processings is determined with the use of parameters δ1 to δp and parameters n1 to np stored in the parameter table 800. The throughput value shown in FIG. 6 can be expressed by the reciprocal of the parameter τ (1/τ). This throughput value is updated by, each time the value of the parameter τ is calculated, determining the reciprocal (1/τ) thereof.

The second calculation section 704 determines n', the tentative number of processings to be assigned to an assignment destination by substituting the parameters k and c determined from the above formulas (3) and (4) and the parameter τ determined from the above formula (5) into the formula (6) below. In the formula, s denotes a numerical value (for example, s=1) indicating that the execution time required for a processing group of processings number n is s times as long as communication time K.

$$n' = \begin{cases} \frac{sc}{\tau - sk} & (\tau - sk \neq 0) \\ -1 & (\tau - sk = 0) \end{cases} \quad (6)$$

Next, the second calculation section 704 calculates n, which is the number of processings to be assigned to the assignment destination, by substituting the tentative number of processings n' determined from the above formula (6) into the formula (7) below. This means that the tentative number of processings n' determined with the above formula (6), for which fluctuation of a small percent is taken into consideration, is set as n, which is the number of processings to be actually assigned to the worker W.

$$n = \begin{cases} \lceil n' \rceil & (n' > 0) \\ 1 & (n' \leq 0) \end{cases} \quad (7)$$

The number of processings n in the case of "n'≦0" (here, n=1) can be arbitrarily set, for example, by the user operating the keyboard 410 or the mouse 411 shown in FIG. 4. Similarly, the value of the parameter s can be arbitrarily set. Specifically, it is possible to increase the value of the parameter s (for example, s=3) when there is a large number of processings in the queue, and decrease the value of the parameter s (for example, s=1) as the number of processings in the queue decreases.

Furthermore, it is possible to increase the value of the parameter s (for example, by one) when a request to increase the number of processings to be assigned is received from an assignment-destination worker W. Furthermore, if, when the value of the parameter w is positive, and a processing group to be executed next is already assigned when execution of a processing group by the assignment-destination worker W is completed, the ratio of the execution time to the communication time is low in comparison with the parameter s, then the value of the parameter s may be decreased (for example, by one). In order to avoid repeating increase and decrease, it is possible to decrease the value of the parameter s, for example, on a constant cycle (for example, when distribution processing of three processing groups ends).

The determination section 707 has a function which determines an assignment destination for assigning a series of processing groups, from among the group of workers W under the control of the master M. That is, the determination section 707 determines an appropriate worker W as an assignment destination from among the group of workers W in the system 100 and causes the assignment destination to perform distributed processing of a series of processing groups.

Specifically, for example, the determination section 707 may determine an assignment destination from among the group of workers W on the basis of the usage state of each worker W. More specifically, for example, the determination section 707 refers to the worker management table 500 and determines an assignment destination from among a group of workers W, the usage state of which is "empty".

In this way, by excluding workers W which are executing a processing group assigned from the master M or whose functions are suspended, it is possible to narrow assignment destination candidates. Furthermore, when there is not a worker W the usage state of which is "empty", a worker W in the state 2 (one processing group is already assigned) may be determined as an assignment destination from among a group of workers which are "in use".

Furthermore, the determination section 707 may determine an assignment destination from among the group of workers W on the basis of the processing performance of each worker W. More specifically, for example, the determination section 707 refers to the throughput table 600 and determines a worker W with the largest throughput value as the assignment destination. Thereby, it is possible to determine a worker W which can execute a processing group at a high speed as the assignment destination.

The receiving section 701, the acquisition section 702, the first calculation section 703, the second calculation section 704, the generation section 705 and the transmission section 706 may execute the receiving processing, the acquisition processing, the first calculation processing, the second calculation processing, the generation processing and the transmission processing again when execution of a processing group transmitted beforehand, among two processing groups which are already assigned to the worker W, is completed.

More specifically, for example, when information about the execution time required for a processing group transmitted the two times before and the waiting time from receiving the processing group transmitted the two times before to starting execution thereof is transmitted from the worker W, the various processings by the receiving section 701, the acquisition section 702, the first calculation section 703, the second calculation section 704, the generation section 705 and the transmission section 706 are executed again.

As a result, the worker W repeats state transition between the state 2 and the state 3 shown in FIG. 2 until there is not processing anymore in the queue in the master M. Thereby, it is possible to hide the time for communication between the master and the worker by the execution time required for a processing group in the worker W and shorten the time required for distributed processing of a series of processing groups.

Figure 9:
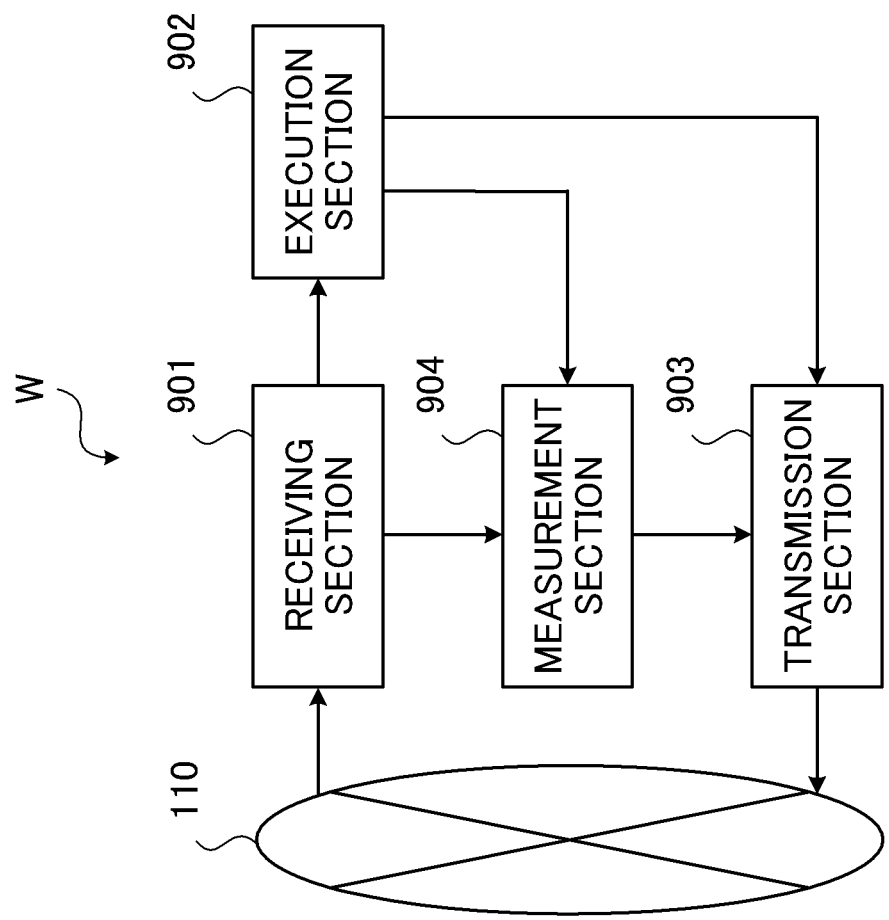
FIG. 9 is a block diagram showing the functional configuration of the worker W.

Next, the functional configuration of the worker W will be disclosed. FIG. 9 is a block diagram showing the functional configuration of the worker W. In FIG. 9, the worker W is constituted by a receiving section 901, an execution section 902, a transmission section 903 and a measurement section 904.

These functions 901 to 904 can be realized by causing a CPU 301 to execute programs related to the functions 901 to 904 stored in the storage section of the worker W, respectively, or by the input/output I/F. Output data from each of the functions 901 to 904 is held in the storage section. It is assumed that a connection-destination function indicated by an arrow in FIG. 9 reads output data of a connection-source function, from the storage section, and causes the CPU to execute the program related to the function.

The receiving section 901 has a function which receives a processing group from the master M. The execution section 902 has a function which executes the processing group assigned from the master M. The processing group is executed by the CPU of the worker W, and the execution result is stored in the storage section of the worker W.

The transmission section 903 has a function which transmits the execution result of the processing group to the master M, as a result of execution that all the processings constituting the processing group are completed by the execution section 902. Specifically, for example, a detection section not shown detects that execution of all the processings constituting the processing group has been completed by the execution section 902.

Then, when it is detected by the detection section not shown that execution of all the processings has been completed, the transmission section 903 transmits the execution result of the processing group to the master M. In this case, by setting an IP address identified from the processing group as the destination, the execution result can be transmitted to the master M.

The measurement section 904 has a function which measures the waiting time from when the processing group is received by the receiving section 901 to when execution of the processing group is started by the execution section 902. Specifically, for example, the waiting time can be measured from the receiving date and time when the processing group was received and the start date and time when execution of the processing group was started.

Furthermore, the measurement section 904 has a function which measures the time required for execution of the processing group by the execution section 902. Specifically, for example, the execution time can be measured from the start date and time when execution of the processing group was started and the completion date and time when the execution of the processing group was completed.

The transmission section 903 has a function which transmits information about the waiting time and/or execution time measured by the measurement section 904 to the master M. This information is used for the calculation processing by the first calculation section 703 of the master M.

If receiving of a processing group to be executed next by the receiving section 901 has not been completed when execution of the processing group by the execution section 902 is completed, the transmission section 903 may transmit a request to increase the number of processings to be assigned, to the master M.

Specifically, for example, when the communication time required for passing of the current processing group is long in comparison with the execution time required for the last processing group assigned from the master M, a request to increase the number of processings of the next processing group is transmitted to the master M. Thereby, it is possible to conceal appropriately the communication time required for passing of a processing group between the master and the worker.

(Distribute Processing Procedure of Distribute Processing Apparatus)

Figure 10:
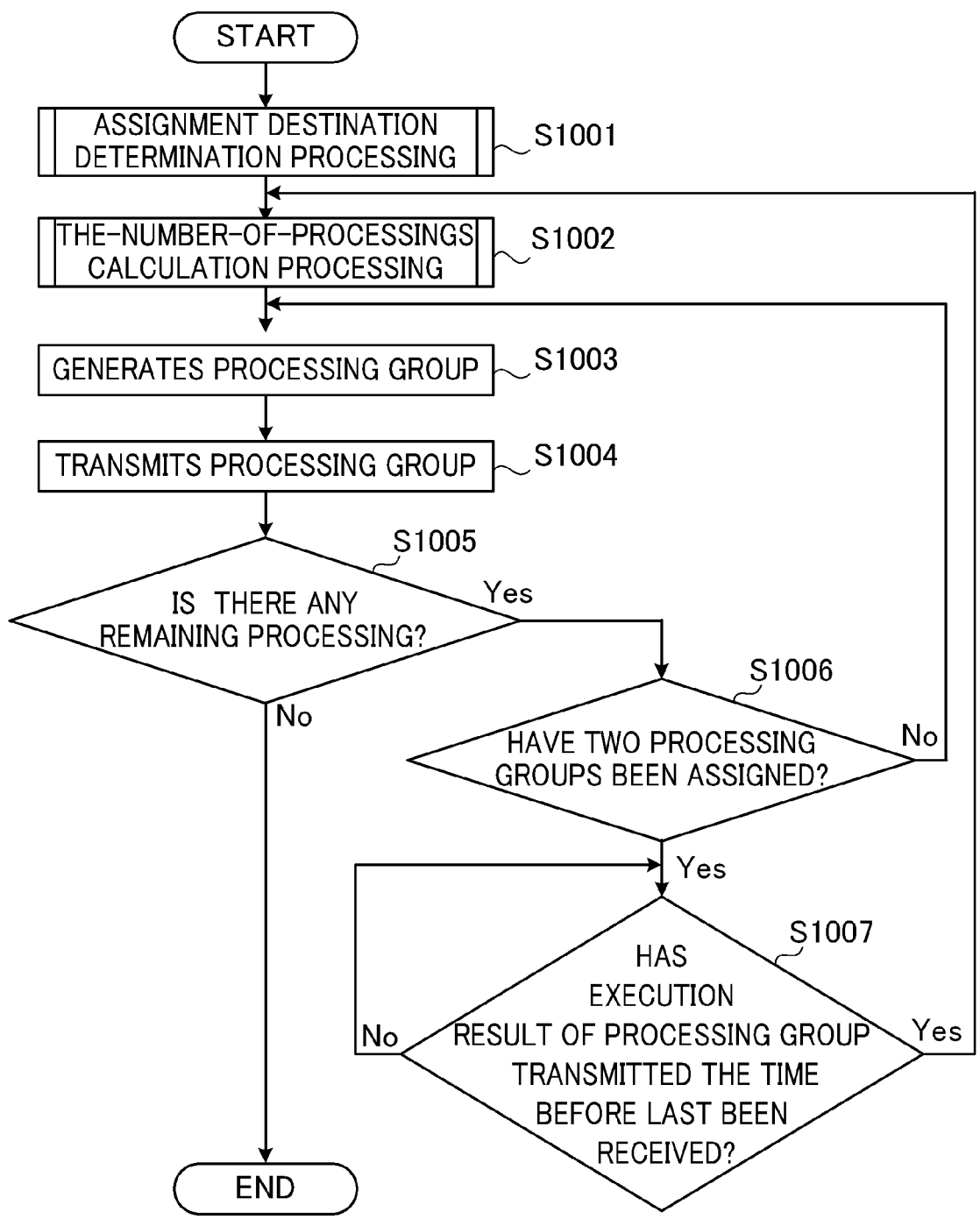
FIG. 10 is a flowchart showing an example of a distributed processing procedure in the master M.

Next, the distribution processing procedure of the distributed processing apparatus will be disclosed. Here, description will be made on a distributed processing procedure when there are processings in the queue in the master M, and the worker W is caused to perform distributed processing of the processings. The distributed processing procedure in the master M will be disclosed. FIG. 10 is a flowchart showing an example the distributed processing procedure in the master M.

In the flowchart of FIG. 10, the determination section 707 executes assignment destination determination processing for finding a worker W to be the assignment destination of the processings in the queue (step S1001). After that, the-number-of-processings calculation processing for calculating the number of processings to be assigned to the assignment-destination worker W determined at step S1001 is executed (step S1002).

Next, the generation section 705 generates a processing group to be assigned to the assignment-destination worker W on the basis of the number of processings n calculated at step S1002 (step S1003). In this case, if the number of processings n is larger than the number of all processings in the queue N, a processing group in which the processings corresponding to the number of processings in the queue N are collected is generated.

After that, the transmission section 706 transmits the processing group generated at step S1003 to the assignment-destination worker W (step S1004). Next, it is judged whether there is any remaining processing in the queue (step S1005). If there is any remaining processing (step S1005: Yes), then it is judged whether or not two processing groups have already been assigned to the assignment-destination worker W (step S1006).

Here, if two processing groups have not been assigned yet (step S1006: No), then the flow returns to step 1003 and repeats the series of processings. On the other hand, if two processing groups have already been assigned (step S1006: Yes), then it is judged whether or not the execution result of a processing group transmitted the time before last has been received (step S1007).

Here, receiving of the execution result of the processing group transmitted the time before last is waited for (step S1007: No). If it is received (step S1007: Yes), then the flow returns to step S1002 and repeats the series of processings. If there is not any remaining processing at step S1005 (step S1005: No), then the series of processings by this flowchart ends.

Figure 11:
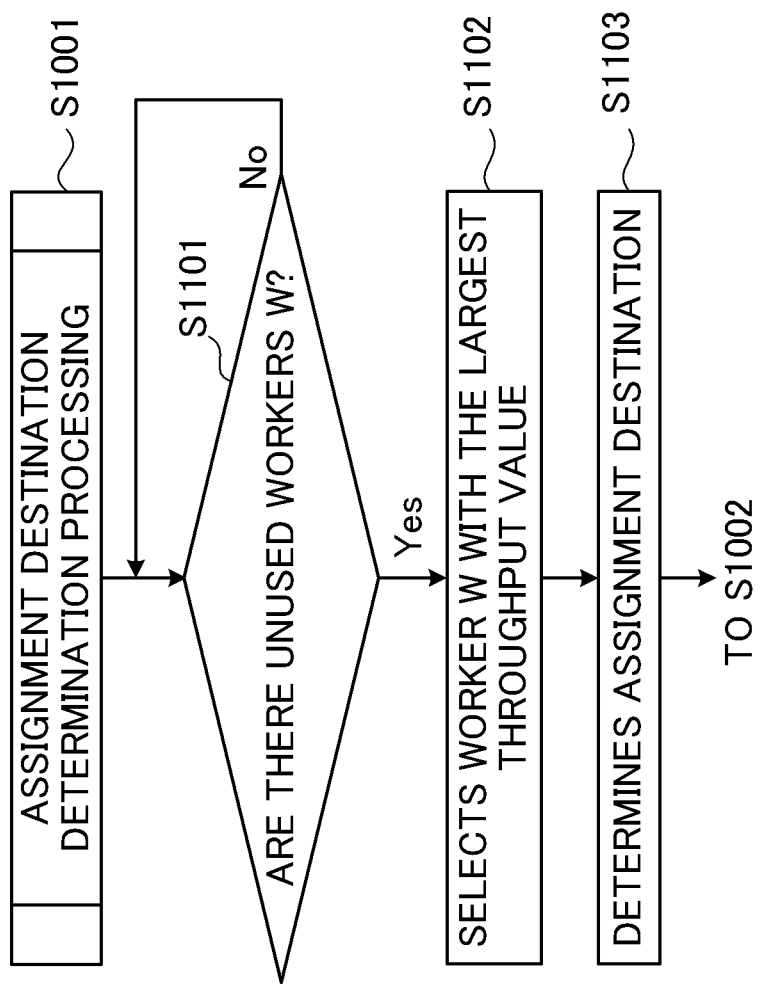
FIG. 11 is a flowchart showing an example of an assignment destination determination processing procedure.

Next, description will be made on a detailed processing procedure of the assignment destination determination processing at step S1001 shown in FIG. 10. FIG. 11 is a flowchart showing an example of the assignment destination determination processing procedure. In FIG. 11, it is judged whether there are unused (empty) workers W on the basis of the worker management table 500 (step S1101). If there is not any unused worker W, the system waits until a worker W becomes usable (step S1101: No).

On the other hand, if there are unused workers W (step S1101: Yes), a worker W with the largest throughput value T is selected from among the unused workers W on the basis of the throughput table 600 (step S1102). Then, the worker W selected at step S1102 is determined as the assignment destination (step S1103), and the flow proceeds to step S1002 shown in FIG. 10.

Figure 12:
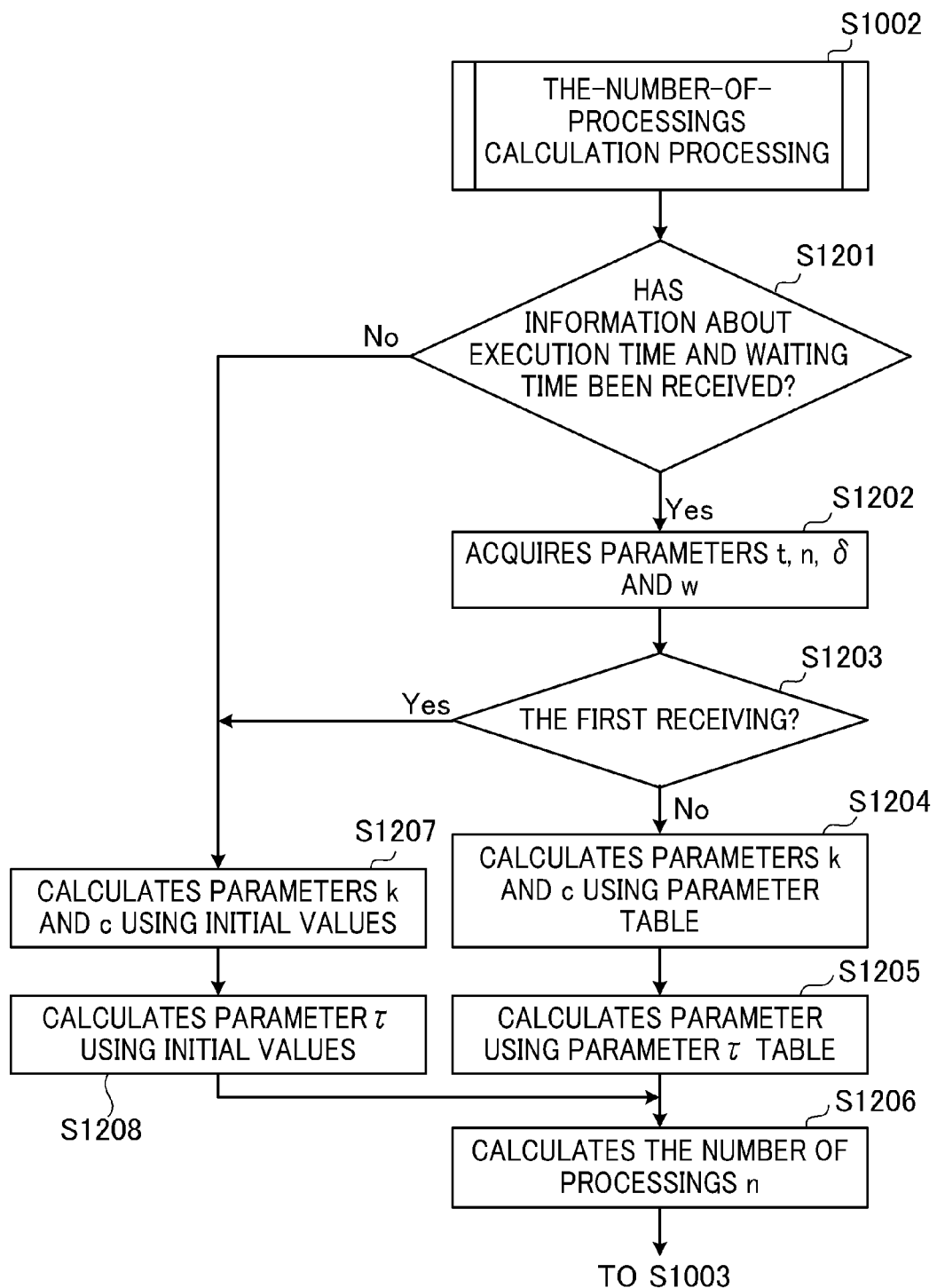
FIG. 12 is a flowchart showing an example of the-number-of-processings calculation processing procedure.

Next, description will be made of a detailed processing procedure of the number-of-processings calculation processing at step S1002 shown in FIG. 10. FIG. 12 is a flowchart showing an example of the number-of-processings calculation processing procedure. In FIG. 11, the receiving section 701 judges whether or not information has been received from the assignment-destination worker W, the information is about the execution time required for a processing group transmitted beforehand and the waiting time from when the processing group transmitted beforehand is received to when execution thereof is started (S1201).

If the information about the execution time and the waiting time has been received (step S1201: Yes), then the acquisition section 702 acquires the parameter t indicating the time elapsed from when the processing group transmitted beforehand was transmitted to the assignment destination to when the execution result of the processing group transmitted beforehand was received from the assignment destination, and the parameters n, δ and w which are identified from the information about the execution time and the waiting time which has been received at step S1201 (step S1202).

After that, it is judged whether or not the receiving of the information at step S1202 is the first receiving (step S1203). If the receiving is not the first receiving (step S1203: No), then the first calculation section 703 calculates the parameters k and c about the communication time required for communication with the assignment destination, using the parameters t, n, δ and w acquired at step S1202 and the contents stored in the parameter table (step S1204).

After that, the first calculation section 703 calculates the parameter τ indicating the execution time in units of processings, using the parameter δ acquired at step S1202 and the contents stored in the parameter table 800 (step S1205). Then, the second calculation section 704 calculates n, the number of processings to be assigned to the assignment destination using the parameters k, c and τ (step S1206), and the flow proceeds to step S1003 shown in FIG. 10.

If the information about the execution time and the waiting time has not been received at step S1201 (step S1201: No) or if the receiving is the first receiving at step S1203 (step S1203: Yes), then the parameters k and c about the communication time required for communication with the assignment destination are calculated with the use of initial values set in advance (step S1207). After that, the parameter τ indicating the execution time in units of processings is calculated with the use of initial values set in advance (step S1208), and the flow proceeds to step S1206.

Figure 13:
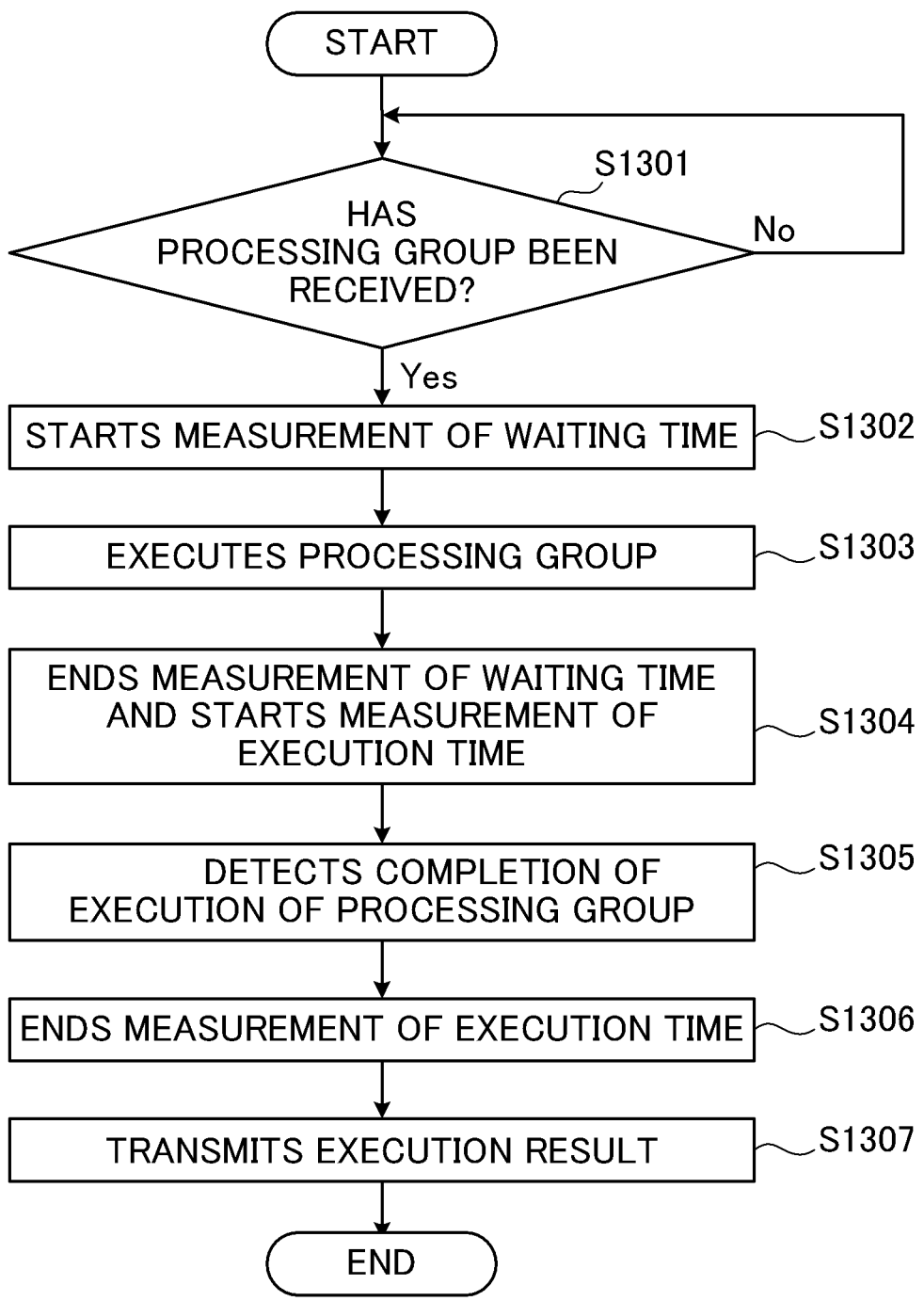
FIG. 13 is a flowchart showing an example a distributed processing procedure in the worker W.

Next, a distributed processing procedure in the worker W will be disclosed. FIG. 13 is a flowchart showing an example of the distributed processing procedure in the worker W. In the flowchart of FIG. 13, the receiving section 901 judges whether or not a processing group has been received from the master M (step S1301).

Receiving of a processing group is waited for (step S1301: No). If it is received (step S1301: Yes), then the measurement section 904 starts measurement of the waiting time from when the processing group is received to when execution of the processing group is started (step S1302).

After that, the execution section 902 executes the processing group assigned from the master M (step S1303). In this case, the measurement section 904 ends measurement of the waiting time and starts measurement of the execution time required for the processing group (step S1304).

Then, when it is detected that execution of all the processings constituting the processing group is completed (step S1305), the measurement section 904 ends measurement of the execution time required for the processing group (step S1306). At the end, the transmission section 903 transmits the execution result of the processing group together with the result of the measurement by the measurement section 904, to the master M (step S1307), and ends the series of processings in accordance with this flowchart.

As disclosed above, according to this embodiment, it is possible to assign, to the worker W, a processing group in which an appropriate number of processings, the execution time for each of which is short, are collected on the basis of the time for communication between the master and the worker and the processing performance of the worker W. Thereby, it is possible to reduce the number of communications between the master and the worker and hide communication overhead.

Furthermore, by executing communication processing between the master and the worker in parallel with execution processing of a processing group by the worker W, it is possible to hide the time for communication between the master and the worker by the execution time required for the processing group. Thereby, it is possible to shorten the time required for distributed processing of a series of processing groups.

More specifically, for example, by assigning a processing group, in which such a minimum number of processings that the time for communication between the master and the worker is equal to or shorter than the execution time required for the processing group are collected, to the worker W, it is possible to suppress increase in the response time before obtaining the execution result and appropriately reduce communication overhead between the master and the worker.

Figure 14A:
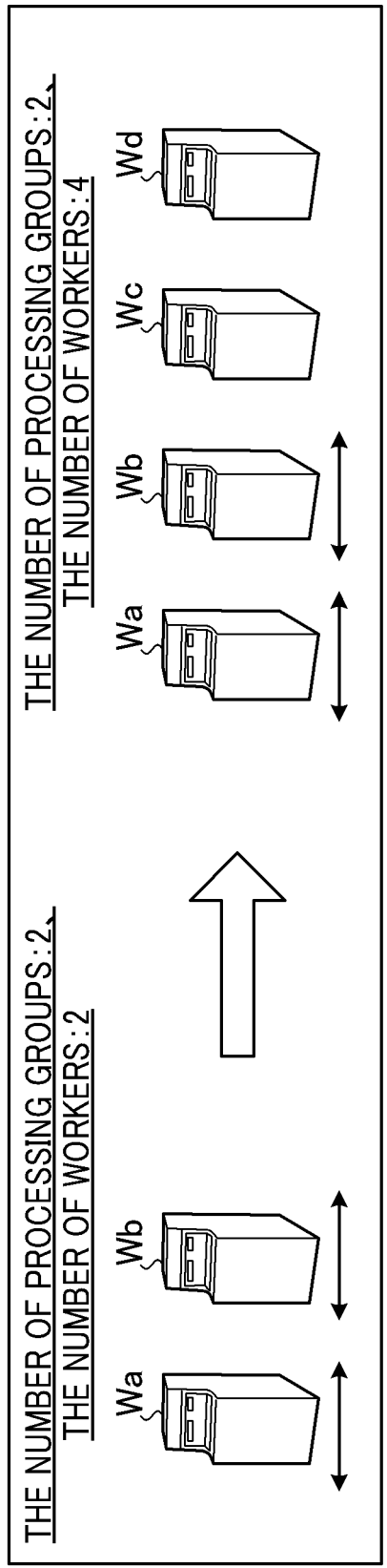
FIG. 14A is a diagram illustrating the state of assignment of processing groups when the number of workers increases.
Figure 14B:
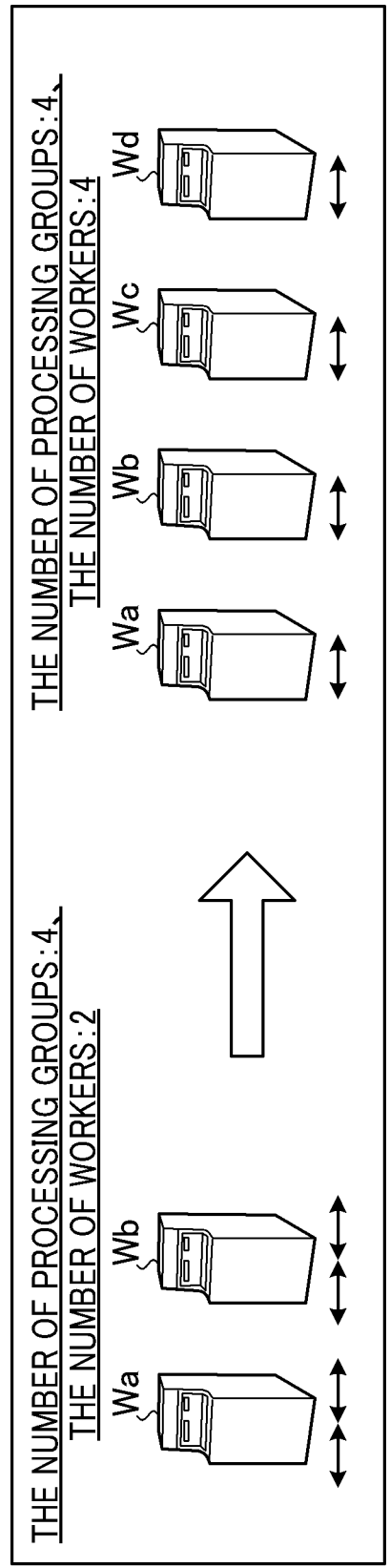
FIG. 14B is a diagram illustrating the state of assignment of processing groups when the number of workers increases.

Furthermore, by suppressing the number of processings to the minimum, it is possible to flexibly respond to increase in the number of workers W and improve the efficiency of distributed processing. Now, the advantages of this embodiment will be specifically disclosed when the number of workers W increases. FIG. 14A and FIG. 14B are diagrams illustrating the state of assignment of processing groups when the number of workers increases. In FIG. 14A and FIG. 14B, the length of a two-headed arrow indicates the number of processings constituting a processing group.

In FIG. 14A, a diagram shows an example that the number of processings of a processing group to be assigned to the worker W is large. In this case, since a large number of processings are collected, it is not possible to, when the number of workers W increases from two to four, assign a processing group to the workers Wc and Wd.

In FIG. 14B, a diagram shows an example that the number of processings of a processing group to be assigned to the worker W is small. In this case, since a small number of processings are collected, it is possible to, when the number of workers W increases from two to four, assign a processing group to each of the workers Wc and Wd. Thus, by suppressing the number of processings to be collected to the minimum, it is possible to, when the number of workers W increases, use more workers W and realize efficient distributed processing.

As disclosed above, in the system 100 of the embodiment disclosed above, it is possible to reduce communication traffic between the master and the worker and improve the efficiency of distributed processing by assigning a processing group in which processings, the execution time for each of which is short, are appropriately collected, to the worker W.

According to the embodiment disclosed above, it is possible to assign a processing group in which an appropriate number of processings, the execution time for each of which is short, are collected on the basis of the time for communication between the master and the worker, to the worker.

Furthermore, it is possible to assign a processing group in which an appropriate number of processings, the execution time for each of which is short, are collected on the basis of the dynamically changing processing performance of the worker, to the worker.

Furthermore, by assigning the next processing group when execution of a processing group assigned the time before last is completed, it is possible to pass the next processing group during execution of the processing group assigned last.

Furthermore, by assigning such a processing group that the execution time is estimated to be longer than the communication time, it is possible to appropriately reduce communication overhead between the master and the worker.

By assigning a processing group in which processings, the execution time for each of which is short, are appropriately collected, it is possible to obtain an advantage of reducing communication traffic between the master and the worker and improving the efficiency of distributed processing.

The distributed processing apparatus disclosed in this embodiment can be realized by an application-specific IC (hereinafter referred to simply as "ASIC"), such as Standard Cell and Structured ASIC (Application Specific Integrated Circuit), or a PLD (Programmable Logic Device) such as FPGA. Specifically, for example, by defining the functions 701 to 706 and 901 to 904 of the distributed processing apparatus disclosed above in HDL, logically synthesizing the HDL description, and giving it to ASIC or PLD, the distributed processing apparatus can be manufactured.

The distributed processing method disclosed in this embodiment can be realized by executing a program prepared in advance by computer such as a personal computer and a workstation. This program is recorded in a computer-readable recording medium such as a hard disk, a flexible disk, a CD-ROM, an MO and a DVD, and it is executed by being read by a computer from the recording medium.

What is claimed is:

1. A non-transitory computer-readable recording medium storing a distributed processing program executed by a computer, the computer being a master calculator which assigns a series of processing groups to a communicable worker calculator, wherein, each of the processing groups includes a plurality of processings, the program comprising:
   receiving information about an execution time and a waiting time from the worker calculator for a series of previously transmitted processing groups, the execution time being a time required for processing the previously processed processing groups, the waiting time being a time from receiving the previously transmitted processing groups to starting execution thereof;
   acquiring the time elapsed from transmitting previously transmitted processing groups to the worker calculator to receiving the execution result of the previously transmitted processing groups from the worker calculator;
   storing the time elapsed, the execution time, and the waiting time in a parameter table;
   calculating a communication time coefficient k and constant c required for communication with the worker calculator by setting up simultaneous equations using parameters k, c, the time elapsed, the execution time, and the waiting time;
   calculating a parameter indicating an average execution time per processing based on the information in the parameter table;
   calculating a number of processings to be assigned to the worker calculator on the basis of the average execution time, and the parameters k and c;
   generating a selected processing group to be assigned to the worker calculator on the basis of the number of processings calculated by the calculating of the number of processings; and
   transmitting the selected processing group generated by the generation means to the worker calculator.

2. The non-transitory computer-readable recording medium according to claim 1, wherein
   the calculating of the communication time calculates a processing performance value from a throughput value of the worker calculator; and
   the calculating of the number of processings calculates the number of processings on the basis of the communication time and the processing performance value calculated by the calculating of the communication time.

3. The non-transitory computer-readable recording medium according to claim 1, wherein, when execution of a processing group transmitted beforehand between two processing groups already assigned to the worker calculator is completed, calculating of the communication time, calculating of the number of processings, the generating and the transmitting are executed again.

4. The non-transitory computer-readable recording medium according to claim 1, wherein the calculating of the number of processings calculates such a number of processings that the communication time is equal to or shorter than the execution time required for the processing group, in which the processings are collected, in the worker calculator.

5. The non-transitory computer-readable recording medium according to claim 1, the program further comprising:
   determining an assignment destination of the series of processing groups from a worker calculator group under the control of the master worker, wherein
   the receiving receives information about the execution time required for the previously transmitted processing group among the series of processing groups and the waiting time from receiving the previously transmitted processing groups to starting execution thereof, from the assignment-destination worker calculator determined by the determining.

6. The non-transitory computer-readable recording medium according to claim 5, wherein the determining determines the assignment destination from the worker calculator group on the basis of a usage state of each of the worker calculators.

7. The non-transitory computer-readable recording medium according to claim 5, wherein the determining determines the assignment destination from the worker calculator group on the basis of a processing performance of each of the worker calculators.

8. A distributed processing apparatus for assigning a series of processing groups to a communicable worker calculator, wherein each of the processing groups includes a plurality of processings, the distributed processing apparatus comprising:
   a memory configured to store a program including a process; and
   a processor configured to execute the program, the process including:
   receiving information about an execution time and a waiting time from the worker calculator for a series of previously transmitted processing groups, the execution time being a time required for processing the previously transmitted processing groups, the waiting time being a time from receiving the previously transmitted processing groups to starting execution thereof;
   acquiring the time elapsed from transmitting the previously transmitted processing groups to the worker calculator to receiving the execution result of the previously transmitted processing groups from the worker calculator;
   storing the time elapsed, the execution time and the waiting time in a parameter table;
   calculating a communication time coefficient k and constant c required for communication with the worker calculator by setting up simultaneous equations using parameters k, c, the time elapsed, the execution time, and the waiting time;
   calculating a parameter indicating an average execution time per processing based on the information in the processing table;
   calculating a number of processings to be assigned to the worker calculator on the basis of the average executing time, and the parameters k and c;
   generating a selected processing group to be assigned to the worker calculator on the basis of the number of processings calculated by the calculating of the number of processings; and
   transmitting the selected processing group generated by the generating to the worker calculator.

9. A distributed processing method for assigning a series of processing groups to a communicable worker calculator, wherein each of the processing groups includes a plurality of processings, the distributed processing method comprising:
   receiving information about an execution time and a waiting time from the worker calculator for a series of previously transmitted processing groups, the execution time being a time required for processing the previously transmitted processing groups, the waiting time being a time from receiving the previously transmitted processing groups to starting execution thereof;

acquiring the time elapsed from transmitting the previously transmitted processing groups to the worker calculator to receiving the execution result of the previously transmitted processing groups from the worker calculator;

storing the time elapsed, the execution time and the waiting time in a parameter table;

calculating a communication time coefficient k and constant c required for communication with the worker calculator by setting up simultaneous equations using parameters k, c, the time elapsed, the execution time and the waiting time;

calculating a parameter indicating an average execution time per processing based on the information in the processing table;

calculating a number of processings to be assigned to the worker calculator on the basis of the average execution time, and the parameters k and c;

generating a selected processing group to be assigned to the worker calculator on the basis of the number of processings calculated by the calculating of the number of processings; and transmitting the selected processing group generated by the generating to the worker calculator.

10. A system comprising:

a plurality of worker calculators; and a distributed processing apparatus configured to assign a series of processing groups to the worker calculator, wherein each of the processing groups includes a plurality of processings, the distributed processing apparatus comprising:

a memory configured to store a program including a process; and a processor configured to execute the program, the process including:

receiving information about an execution time and a waiting time from the worker calculator for a series of previously transmitted processing groups, the execution time being a time required for processing the previously transmitted processing groups, the waiting time being a time from receiving the previously transmitted processing groups to starting execution thereof;

acquiring the time elapsed from transmitting the previously transmitted processing groups to the worker calculator to receiving the execution result of the previously transmitted processing groups from the worker calculator;

storing the time elapsed, the execution time and the waiting time in a parameter table;

calculating a communication time coefficient k and constant c required for communication with the worker calculator by setting up simultaneous equations using parameters k, c, the time elapsed, the execution time, and the waiting time;

calculating a parameter indicating an average execution time per processing based on the information in the processing table;

calculating a number of processings to be assigned to the worker calculator on the basis of the average execution time, and the parameters k and c;

generating a selected processing group to be assigned to the worker calculator on the basis of the number of processings calculated by the calculating of the number of processings; and transmitting the selected processing group generated by the generating to the worker calculator.

* * * * *